(12) United States Patent
Ratnakaram et al.

(10) Patent No.: US 12,081,975 B2
(45) Date of Patent: *Sep. 3, 2024

(54) INTELLIGENT METHOD FOR SIM-SWAP FRAUD DETECTION AND PREVENTION

(71) Applicant: Bank of America Corporation, Charlotte, NC (US)

(72) Inventors: Udaya Kumar Raju Ratnakaram, Hyderabad (IN); Praveena Maddamsetty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 375 days.

This patent is subject to a terminal disclaimer.

(21) Appl. No.: 17/654,690

(22) Filed: Mar. 14, 2022

(65) Prior Publication Data

US 2022/0201478 A1  Jun. 23, 2022

Related U.S. Application Data

(63) Continuation of application No. 16/721,569, filed on Dec. 19, 2019, now Pat. No. 11,317,282.

(51) Int. Cl.
*H04L 9/40* (2022.01)
*H04W 8/20* (2009.01)
*H04W 12/06* (2021.01)
*H04W 12/122* (2021.01)
*H04L 101/654* (2022.01)

(52) U.S. Cl.
CPC ......... *H04W 12/06* (2013.01); *H04L 63/0861* (2013.01); *H04W 8/20* (2013.01); *H04W 12/122* (2021.01); *H04L 2101/654* (2022.05)

(58) Field of Classification Search
CPC ..... H04W 12/06; H04W 12/122; H04W 8/20; H04L 63/0861; H04L 2101/654
See application file for complete search history.

(56) References Cited

U.S. PATENT DOCUMENTS

| 6,819,932 B2 | 11/2004 | Allison et al. |
| 7,363,056 B2 | 4/2008 | Faisy |
| 7,474,894 B2 | 1/2009 | Cardina et al. |

(Continued)

FOREIGN PATENT DOCUMENTS

| AU | 2014227509 B2 | 10/2014 |
| CA | 2837779 C | 12/2012 |

(Continued)

*Primary Examiner* — Stephen T Gundry (57) ABSTRACT

Intelligent systems for detecting SIM swap in mobile devices, wherein if a user requests access to an account via a mobile device, a mobile device application (MDA) sends the request along with mobile device ID and IMSI. If all information received from the MDA matches information stored in memory, the user can access the account. If the mobile device ID or IMSI received from the MDA do not match the mobile device ID or IMSI stored in memory, a social intelligence module compares a mobile device user profile with a profile for a user associated with the account ID. If the mobile device user profile matches or is within a confidence level of the profile for the user associated with the account ID, the user can access the account. Otherwise, additional methods to validate the user may be implemented to prevent possible fraudsters from accessing the account.

16 Claims, 5 Drawing Sheets

(56) References Cited

U.S. PATENT DOCUMENTS

| | | |
|---|---|---|
| 7,561,691 B2 | 7/2009 | Blight et al. |
| 7,849,029 B2 | 12/2010 | Crooks et al. |
| 8,141,136 B2 | 3/2012 | Lee et al. |
| 8,190,503 B2 | 5/2012 | Green et al. |
| 8,650,614 B2 | 2/2014 | Nahari et al. |
| 8,655,381 B2 | 2/2014 | Maitland |
| 8,660,943 B1 | 2/2014 | Chirehdast |
| 8,725,180 B2 | 5/2014 | Lee et al. |
| 8,826,371 B2 | 9/2014 | Webb et al. |
| 9,082,116 B1 | 7/2015 | Gupta et al. |
| 9,119,140 B2 | 8/2015 | Larsson |
| 9,154,939 B2 | 10/2015 | Markov et al. |
| 9,160,830 B2 | 10/2015 | Jain et al. |
| 9,384,479 B2 | 7/2016 | Larkin |
| 9,419,956 B2 | 8/2016 | Abraham et al. |
| 9,520,911 B2 * | 12/2016 | Selvaraj ............... H04W 12/48 |
| 9,633,355 B2 | 4/2017 | Dave et al. |
| 9,681,305 B2 | 6/2017 | Colegate et al. |
| 9,699,660 B1 | 7/2017 | Blatt et al. |
| 9,792,609 B2 | 10/2017 | Burke et al. |
| 9,824,358 B2 | 11/2017 | Ericson et al. |
| 9,979,832 B2 | 5/2018 | Baldwin et al. |
| 10,178,223 B1 | 1/2019 | Marimuthu |
| 10,225,413 B2 | 3/2019 | Velusamy et al. |
| 10,320,800 B2 | 6/2019 | Guo et al. |
| 10,510,080 B2 | 12/2019 | Ranganath et al. |
| 11,770,706 B1 * | 9/2023 | Lilley ................ H04L 63/0853 379/265.09 |
| 11,785,008 B1 * | 10/2023 | Alexander ............ H04W 12/71 726/6 |
| 11,792,176 B1 * | 10/2023 | Lester ................. G06F 21/552 726/5 |
| 2004/0103049 A1 | 5/2004 | Kerr |
| 2008/0293408 A1 | 11/2008 | Jiang |
| 2009/0100032 A1 | 4/2009 | Jones et al. |
| 2010/0225949 A1 | 9/2010 | Silverbrook et al. |
| 2010/0262541 A1 | 10/2010 | Wolfowitz |
| 2011/0302182 A1 | 12/2011 | Crawford |
| 2012/0233103 A1 | 9/2012 | Ashrafi |
| 2013/0047034 A1 | 2/2013 | Salomon et al. |
| 2013/0268641 A1 | 10/2013 | Colbert et al. |
| 2016/0125412 A1 | 5/2016 | Cannon |
| 2016/0140564 A1 | 5/2016 | Einhorn |
| 2016/0224970 A1 | 8/2016 | Pama |
| 2017/0331819 A1 | 11/2017 | Quirke et al. |
| 2020/0042723 A1 * | 2/2020 | Krishnamoorthy ..... G06F 21/45 |
| 2021/0195411 A1 * | 6/2021 | Ratnakaram .......... H04W 12/12 |
| 2021/0282018 A1 * | 9/2021 | Talwar .................. H04L 63/107 |
| 2021/0328990 A1 * | 10/2021 | Ju .......................... H04L 63/102 |
| 2021/0409956 A1 * | 12/2021 | Wagner .................... H04W 4/02 |
| 2022/0150707 A1 | 5/2022 | Loreskar ............... H04W 12/48 |
| 2022/0159449 A1 | 5/2022 | Desai ...................... H04W 4/14 |
| 2022/0198422 A1 | 6/2022 | Desai ...................... H04W 4/02 |
| 2022/0270086 A1 * | 8/2022 | Raj ....................... G06Q 20/326 |
| 2022/0271940 A1 * | 8/2022 | Rogers .................. G06F 21/575 |
| 2022/0294785 A1 * | 9/2022 | Cannon, Jr. .......... H04L 63/0884 |
| 2022/0311763 A1 * | 9/2022 | Krishan ............... H04L 63/0853 |
| 2022/0358484 A1 * | 11/2022 | Brudnicki ........... H04W 12/068 |
| 2023/0027202 A1 * | 1/2023 | Misra .................... G06Q 20/322 |
| 2023/0045525 A1 * | 2/2023 | Stubblefield ........ H04L 63/0876 |
| 2023/0368187 A1 * | 11/2023 | Chisholm .......... G06Q 20/3223 |
| 2023/0410116 A1 * | 12/2023 | Dutt .................... H04W 12/065 |
| 2024/0106822 A1 * | 3/2024 | Kaditz ................ H04L 63/0876 |

FOREIGN PATENT DOCUMENTS

| | | |
|---|---|---|
| CN | 102761346 A | 10/2012 |
| CN | 202551148 U | 11/2012 |
| CN | 103064816 A | 4/2013 |
| CN | 103548044 A | 1/2014 |
| CN | 104104774 A | 10/2014 |
| CN | 104185232 A | 12/2014 |
| CN | 204360478 U | 5/2015 |
| CN | 105357662 A | 2/2016 |
| CN | 104702784 B | 7/2017 |
| DK | 2793493 T3 | 2/2019 |
| EP | 2509294 A1 | 10/2012 |
| EP | 2975874 A1 | 1/2016 |
| EP | 3040922 A1 | 7/2016 |
| EP | 2579630 B1 | 12/2016 |
| GB | 2492312 A | 1/2013 |
| GB | 2517276 A | 2/2015 |
| RU | 2316045 C2 | 1/2008 |
| WO | 2006085107 A1 | 8/2006 |
| WO | 2013121208 A1 | 8/2013 |
| WO | 2016042473 A1 | 3/2016 |
| WO | 2016050990 A1 | 4/2016 |
| WO | 2016197997 A1 | 12/2016 |
| WO | 2019040156 A1 | 2/2019 |

* cited by examiner

INTELLIGENT METHOD FOR SIM-SWAP FRAUD DETECTION AND PREVENTION

CROSS-REFERENCE TO RELATED APPLICATIONS

This application is a continuation of U.S. patent application Ser. No. 16/721,569 filed Dec. 19, 2019, by Udaya Kumar Raju Ratnakaram et al., and entitled "INTELLIGENT METHOD FOR SIM-SWAP FRAUD DETECTION AND PREVENTION," which is incorporated herein by reference.

TECHNICAL FIELD

The present disclosure relates generally to account security, and more specifically to intelligent methods for detecting a new Subscriber Identification Module (SIM) card associated with an account, accommodating authenticated users with new mobile devices, and protecting accounts from SIM-swap and other fraudulent activities.

BACKGROUND

Many people now use mobile phones, PDAs and other mobile devices to perform transactions and conduct business. The capabilities of mobile phones makes it easier for people to conduct business that previously required the person to physically visit a building. For example, many people now have the freedom to use applications stored on mobile phones, PDAs and other mobile devices to access accounts from almost anywhere in the world. A disadvantage to this freedom is the ability for fraudsters to develop techniques to impersonate the user or otherwise trick an institution into allowing the fraudster to access an account.

One of the techniques used by fraudsters is referred to as SIM-swap fraud. In SIM-swap fraud, a fraudster learns information about a person, such as by researching social media account postings and other publicly available methods. The fraudster uses this information in steps to impersonate a user. In a first step, the fraudster contacts the user's mobile device provider and, claiming to be owner or the mobile device, requests a new SIM card. If the mobile device provider is not careful, the fraudster is able to get a SIM card that has information corresponding to the user.

The second step involves the fraudster contacting an institution and, claiming to be the user using a new device, requests access by talking to a customer service agent. A person at the institution is then in an awkward position of possibly denying access to an account by an actual customer or allowing access to a fraudster claiming to be a customer.

If the customer service agent allows a fraudster to "SIM-swap" and updates the account information to the swapped SIM card identification, there is the possibility that a user will be denied access to his/her own account.

SUMMARY

The systems disclosed in the present application provide technical solutions to the technical problems discussed above by providing a system to authenticate users to access accounts while preventing access by fraudsters. The disclosed systems provide several practical applications and technical advantages which include 1) a process for generating a mobile device user profile using third-party applications; 2) a process for comparing a mobile device user profile with a user profile for a user associated with an account ID; 3) a process for authenticating a user associated with a new mobile device and/or Subscriber Identity Module (SIM) card International Mobile Subscriber Identity (IMSI) information; and 4) a process for detecting SIM-swap and other fraudulent activities related to a mobile device.

Embodiments disclosed herein may be generally directed to a system for intelligent authentication of a user when the user requests to access an account using a mobile device. The system comprises a mobile device application (MDA) to retrieve user information and a social intelligence interceptor and social intelligence module to enable users to add mobile devices to their account information while preventing access by fraudsters.

The mobile device application is configured to receive user information from a mobile device user requesting access to an account. The MDA is further configured to retrieve a mobile device identity (ID) from mobile device memory and retrieve an International Mobile Subscriber Identity (IMSI) from a Subscriber Identity Module (SIM) card inserted in the mobile device.

The social intelligence interceptor is configured to communicate with the mobile device application to get the mobile device user information, the mobile device ID and the IMSI. The social intelligence interceptor sends calls to Application Programming Interfaces (APIs) associated with third-party applications installed on the mobile device and collects mobile device user application information associated with the third-party applications. Mobile device user application information includes mobile device user application profile information and mobile device user application usage information. Mobile device user application profile information may include a number of user profiles stored on the mobile device. In some embodiments, mobile device user application usage information comprises a frequency of use of third-party applications by the mobile device user or a number of times a third-party application is accessed by the mobile device user. A third-party application may be a social networking site. The social intelligence interceptor generates a mobile device user profile based on the collected information.

A server communicatively coupled to the mobile device comprises a processor and a memory storing account information including an account identity (ID), user information, a mobile device ID and an IMSI associated with the account ID. The server also includes a social intelligence module and an authentication module implemented on one or more hardware processors.

The social intelligence module is configured to communicate with the memory to retrieve the user information, the mobile device ID and the IMSI associated with the account ID, send service calls to in-house applications, and collect user application information from in-house applications. User application information includes user application profile information and user application usage information. In some embodiments, user profile information received from the API includes a number of user profiles for third-party applications. User application usage information may include a frequency of use of one or more of the third-party applications by a user associated with the account ID. The social intelligence module generates a user profile based on the user application profile information and the user application usage information for in-house applications and third-party applications.

The authentication module is configured to receive the mobile device user information, the mobile device ID and the IMSI from the MDA and compare the mobile device user information with the user information associated with the account ID. The authentication module compares the mobile device ID and the IMSI received from the MDA with the mobile device ID and the IMSI associated with the account ID.

If the mobile device user information, the mobile device ID and the IMSI received from the MDA match the user information, the mobile device ID and the IMSI associated with the account ID, the mobile device user is authenticated and allowed access to the account.

If one or more of the mobile device ID and the IMSI received from the MDA do not match the mobile device ID and the IMSI associated with the account ID, the authentication module is configured to calculate a profile match confidence between the mobile device user profile and a profile for a user associated with the account ID.

In some embodiments, the authentication module compares mobile device user application profile information with user application profile information associated with the account ID. In some embodiments, the authentication module determines if a total number of application profiles associated with the mobile device ID received from the MDA is within a range of a total number of authenticated user application profiles associated with the account ID.

In some embodiments, the authentication module compares the mobile device user application usage information with user application usage information associated with the account ID. The authentication module compares a frequency of use of third-party applications by the mobile device user with a frequency of use of third-party applications by a user associated with the account ID and determines if the frequency of use of third-party applications by the mobile device user is within a range of a frequency of use of third-party applications by the user associated with the account ID. In some embodiments, the authentication module compares a number of times a third-party application is accessed by the mobile device user with a number of times the third-party application is accessed by a user associated with the account ID and determines if the number of times the third-party application is accessed by the mobile device user is within a range of the number of times the third-party application is accessed by a user associated with the account ID.

If the profile match confidence is above a profile match confidence threshold, the authentication module is configured to authenticate the mobile device user to allow access to the account using the mobile device ID and the IMSI received from the MDA. In some embodiments, one or more of the mobile device ID and the IMSI received from the MDA are added to the user information associated with the account ID.

If the profile match confidence is below the profile match confidence threshold, the authentication module is configured to send an instruction to the MDA to prompt the mobile device user to provide additional verification.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Typically, when a user wants to have remote access to an account, the user installs a mobile device application (MDA) on the mobile device and follows an initial setup process to link a username and password with the account. In an initial setup, a user typically registers a username and password, and may also provide other information such as security questions and answers, biometric information, a recovery email or other information. A server communicatively coupled to the mobile device receives the information and stores it in memory associated with the account identification (ID).

When a user attempts to log in to an account using the MDA, the user enters his/her username and password. The server compares the username and password received from the MDA with the username and password information stored in memory. If the username and password match the information stored in memory, the user is authenticated and allowed to access the account.

A server might not authenticate a user for various reasons. For example, the user might have forgotten his/her username and/or password. In these cases, the user may be presented with security questions they must answer correctly. In other systems, a user might not be authenticated if the mobile device ID sent by the mobile device does not match the mobile device ID stored on the server. Ideally, a server does not authenticate a user that attempts to fraudulently access the account using a mobile device.

Mobile Device Environment

Figure 1:
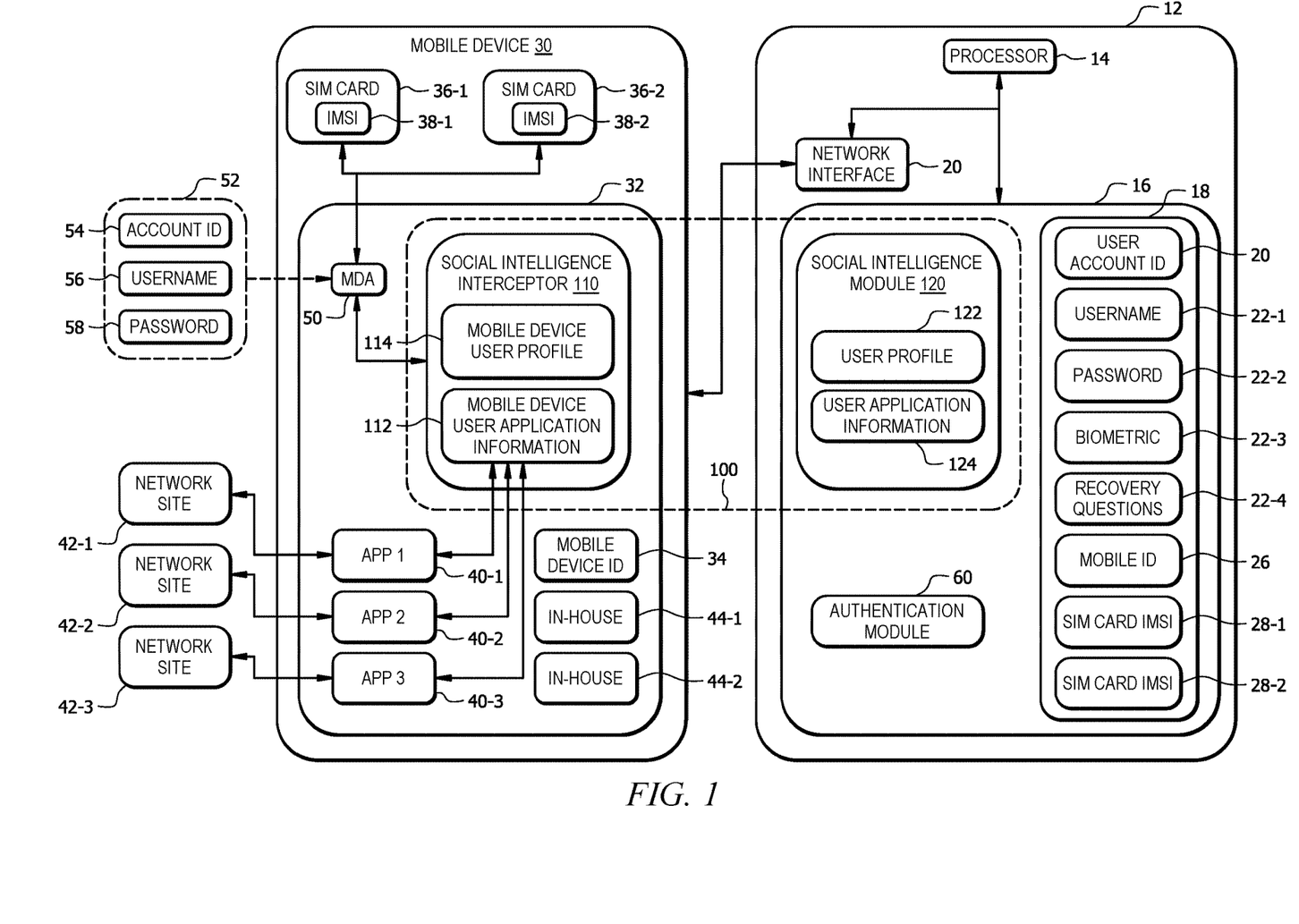
FIG. 1 is a schematic diagram of a system for authenticating users of mobile devices.

FIG. 1 is an architectural diagram of a system for authenticating users of mobile devices. In one embodiment, server 12 is communicatively coupled to a plurality of mobile devices 14 to allow users to access their accounts 18.

Server 12 comprises processor 14 communicatively coupled to memory 16 storing account information 18 for an account held by a user associated with the account identification (ID). In some embodiments, account information 18 corresponds to an account ID associated with a financial institution. Account information 18 includes information used by server 12 to determine an identity of a user attempting to access an account. User information includes account identification (ID) 20, username 22-1 and password 22-2. User information may also include biometric information 22-3, password recovery questions 22-4, personal identification numbers (PINs), user preferences such as nicknames, language(s) spoken, and other preferences as well as geographic information, network passwords or other information associated with a user or necessary for a user to access an account.

If a user wants to access an account using a mobile device, account information 18 also includes mobile device information associated with each mobile device used by a user with access to the account. As depicted in FIG. 1, mobile device information includes mobile device ID 26 associated with an account ID, SIM card IMSI information 28-1 and SIM card IMSI information 28-2, discussed below.

Server 12 comprises network interface 20 communicatively coupled to a plurality of mobile devices 30. Mobile devices 30 includes any cellular device, PDA, tablet or other device configured for connecting to a mobile device network for communicating with server 12.

Each mobile device 30 is identifiable by a unique and permanent mobile device ID 34 stored in mobile device memory 32. For mobile devices 30 to communicate on a network, mobile device 30 also includes at least one Subscriber Identity Module (SIM) card 36. FIG. 1 depicts mobile device 30 with two SIM cards 36-1, 36-2, collectively referred to as SIM card(s) 36. Each SIM card 36 has a SIM serial number, also referred to as an integrated circuit card identifier (ICCID). ICCIDs are stored in SIM cards 36 and contain information such as a mobile network operator, a location of SIM card 36, and when SIM card 36 was manufactured. Each SIM card 36-1, 36-2 has a unique International Mobile Subscriber Identity (IMSI) 38-1, 38-2, respectively. An IMSI 38 is used to acquire the details of mobile device 30 in a Home Location Register (HLR) or a Visitor Location Register (VLR). For example, SIM card 36-1 may enable communication in a first network (e.g., a communications network in the U.S.) and SIM card 36-2 may enable communication in a second network (e.g., a communications network in Europe), allowing a user to access an account from the U.S. and Europe using the same mobile device 30. Each SIM card 36-1, 36-2 may be removed from a first mobile device 30 and inserted in a second mobile device 30, which is commonly done when a user purchases or otherwise replaces a mobile device. Furthermore, a user may remove a first SIM card 36 associated with a first network and install a replacement SIM card 36 associated with a second network.

A user of mobile device 30 may customize the functionality of mobile device 30 by installing various applications (apps). As depicted in FIG. 1, applications 40-1, 40-2 and 40-3 installed in mobile device memory 32 allow a user of mobile device 30 to interact with first application 42-1, second application 42-2 and third application 42-3. One or more applications 40 installed in mobile device memory 32 may be associated with social networking sites. Mobile device memory 32 may also contain one or more in-house applications 44. As depicted in FIG. 1, applications 44-1 and 44-2 installed in mobile device memory 32 provide additional functionality for a user of mobile device 30.

User Authentication

Figure 2:
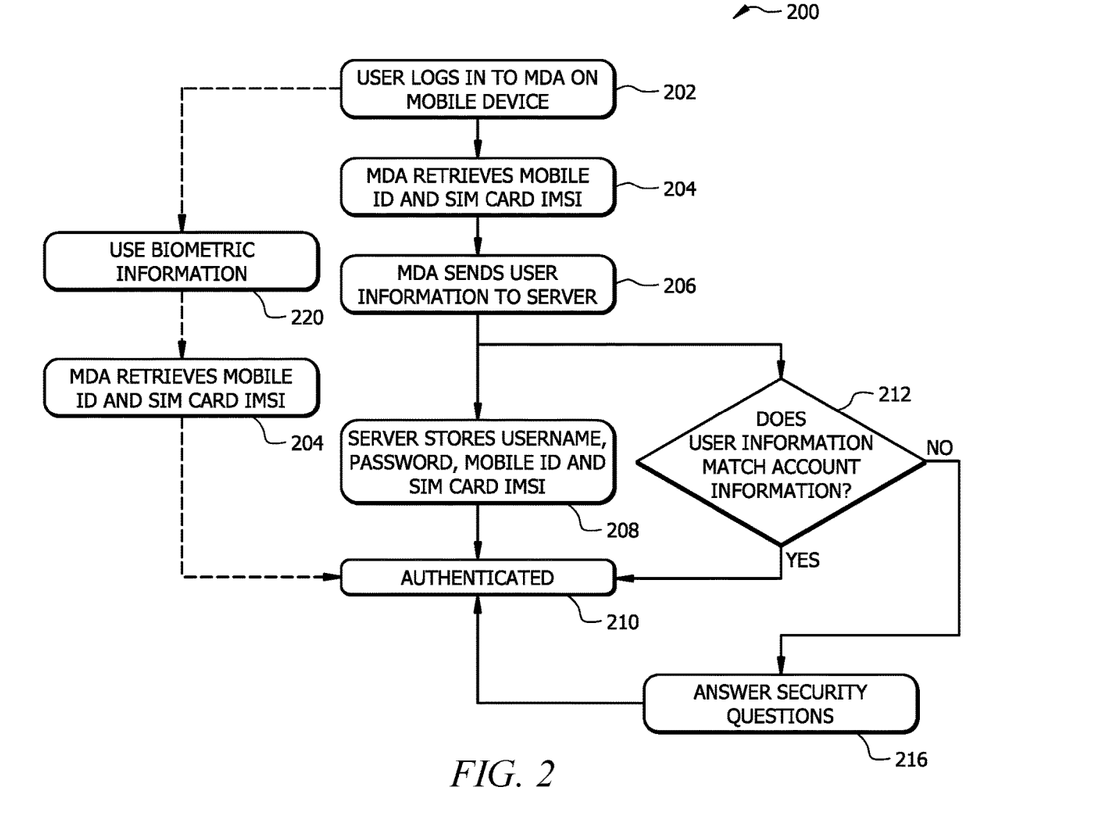
FIG. 2 is a flowchart of a process used to authenticate users during an initial mobile device setup and subsequent uses of the same mobile device and SIM card.

Embodiments disclosed herein include a mobile device application (MDA) 50 to allow a user of mobile device 30 to access an account with an institution. FIG. 2 is a flowchart of process 200 used to authenticate users during an initial mobile device setup and subsequent uses of the same mobile device and SIM card.

Process 200 begins at step 202 when a user logs in to mobile device application (MDA) 50 and enters user information 52. If it is the first time the user is attempting to access an account, MDA 50 may prompt the user to provide account ID 54 and perform an initial set up which may include providing additional user information including username 56 and password 58, and may also include providing biometric information, username/password recovery questions and user preferences.

At step 204, MDA 50 retrieves mobile device identification (mobile device ID) 34 and communicates with Subscriber Identity Module (SIM) card 36 to retrieve International Mobile Subscriber Identity (IMSI) 38.

At step 206, MDA 50 communicates user information 52 including account ID 54, username 56 and password 58, along with mobile device ID 34 and SIM card IMSI 38 to server 12.

If user information 52 is being provided during an initial setup, then at step 208, server 12 stores account ID 54 as user account ID 20, stores username 56 as username 22-1 and stores password 58 as password 22-2 in memory 16. Furthermore, during an initial setup, server 12 stores mobile device ID 34 as a mobile ID 26 associated with account ID 20 and stores SIM card IMSI 38-1, 38-2 as IMSI 28-1 and 28-2 associated with account ID 20. If any biometric information 22-3, recovery questions 22-4, personal identification numbers (PINs), user preferences or other user information is provided by a user associated with account ID 20, that information is also stored in account information 18. Once a new user has set up an account, process 200 ends at step 210 when the user is authenticated and able to access an account associated with account ID 20.

If a user has set up an account and is wanting to access the account, process 200 starts at step 202 when the user logs in to mobile device application (MDA) 50 and enters user information 52. At step 204, MDA 50 retrieves mobile device identification (mobile device ID) 34 and communicates with Subscriber Identity Module (SIM) card 36 to retrieve International Mobile Subscriber Identity (IMSI) 38. At step 206, MDA 50 communicates user information 52 including account ID 54, username 56 and password 58, along with mobile device ID 34 and SIM card IMSI 38 to server 12.

After MDA 50 communicates user information 52, mobile device ID 34 and IMSI 38 at step 206, then at step 212, server 12 determines if user information 52 matches account information 18 associated with account ID 20 and determines if mobile device ID 34 matches mobile ID 26 associated with account ID 20 and IMSI 38 matches IMSI 28 associated with account ID 20.

If server 12 determines username 56 matches username 22-1, password 58 matches authenticated password 22-2, mobile device ID 34 matches mobile ID 26 and IMSI 38 matches IMSI 28, then the user of mobile device 30 is authenticated at step 210 and able to access the account. If server 12 determines user information 52 does not match account information 18, then at step 216, server 12 may communicate instructions to prompt the user to answer recovery questions 22-4. Once the user answers recovery questions 22-4, process 200 ends when the user is authenticated at step 210. In some implementations, once a user answers recovery questions 22-4, the user may be prompted to change username 22-1 and/or password 22-2 associated with account ID 20.

In some systems, process 200 includes an option at step 220 in which the user can provide biometric information useful for facial or voice recognition. In step 220, biometric information captured by a camera is compared with biometric information 22-3 stored in account information 18 to authenticate a user at step 210. At step 204, MDA 50 retrieves mobile device identification (mobile device ID) 34 and communicates with Subscriber Identity Module (SIM)

card 36 to retrieve International Mobile Subscriber Identity (IMSI) 38. Once the user is recognized, process 200 ends when the user is authenticated at step 210.

Figure 3:
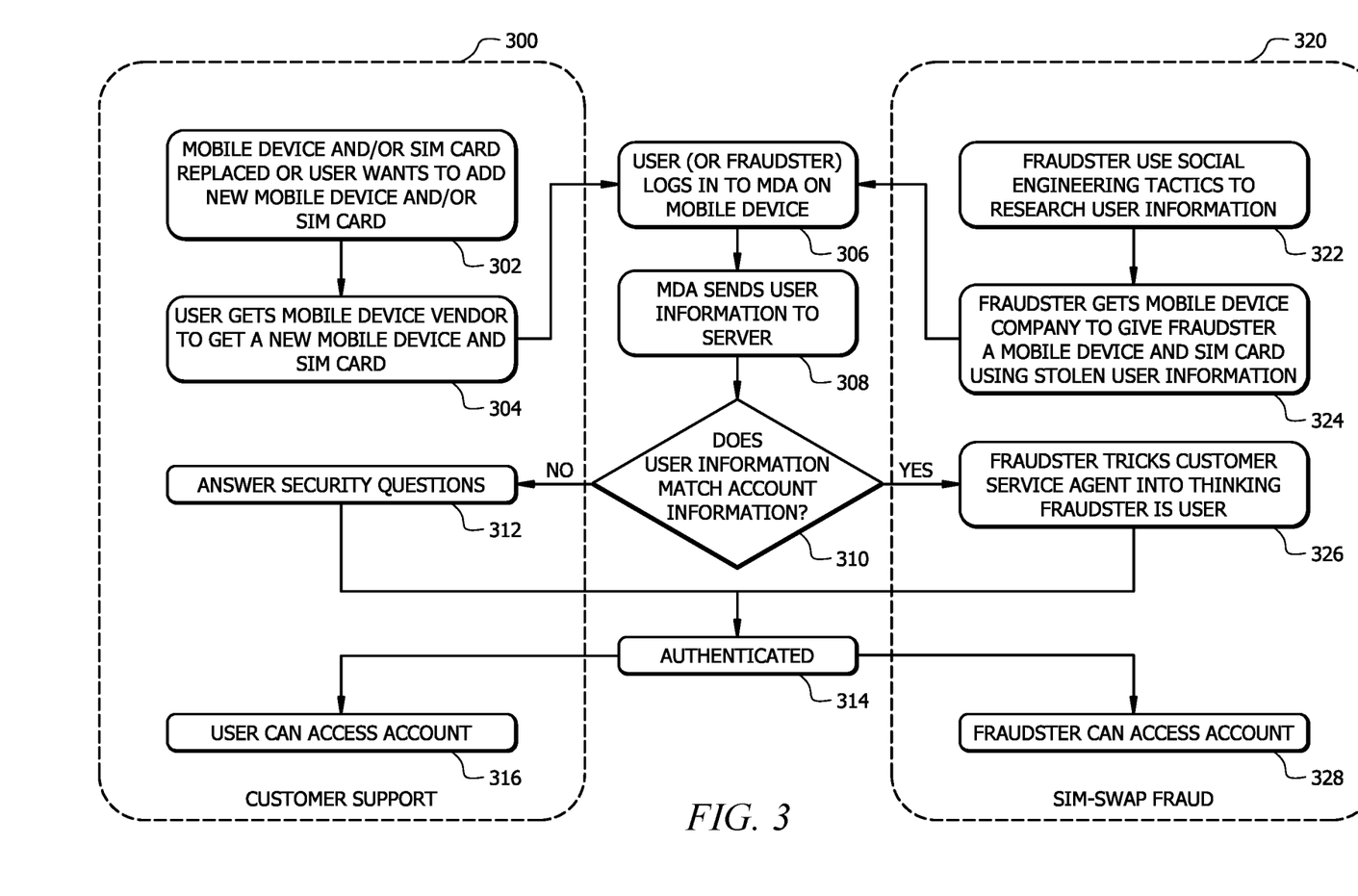
FIG. 3 is a flowchart of an authentication process for users with new/replacement devices and SIM cards and a SIM-swap fraud technique used by fraudsters to gain access to accounts.

With the increased use of mobile devices for banking and other financial transactions comes the possibility that a user forgets his/her account number or a password, the likelihood that a user will get a new mobile device or SIM card, the likelihood that a user will lose his/her mobile device and the likelihood that a mobile device will get stolen. FIG. 3 is a flowchart depicting a comparison between a customer support process (represented by steps 302, 304 and 312) used to authenticate users with new/replacement devices and a SIM-swap scheme (represented by steps 322, 324 and 326) implemented by fraudsters for fraudulent access to accounts.

A customer service process 300 for a user may begin at step 302, when a user wants to replace mobile device 30 and or SIM card 36 (such as when a mobile device is lost or stolen) or the user wants to access an account using a new mobile device 30 and/or a new SIM card 36. At step 304, the user contacts a mobile device vendor to get a new mobile device 30 and/or SIM card 36.

At step 306, the user logs in to a new instance of MDA 50 installed on mobile device 30. Mobile device 30 and/or MDA 50 might not be set up to capture biometric information, so the user enters user information 52 including mobile account ID 54, username 56 and password 58. MDA 50 is configured to retrieve mobile device ID 34 for mobile device 30 and communicate with Subscriber Identity Module (SIM) card 36 to retrieve International Mobile Subscriber Identity (IMSI) information 38 for SIM card 36.

At step 308, MDA 50 communicates user information 52 including account ID 54, username 56 and password 58, along with mobile device ID 34 and SIM card IMSI 38 to server 12.

At step 310, server 12 determines if user information 52 matches account information 18. At step 312, if server 12 determines user information 52 does not match account information 18, then server 12 may communicate instructions to prompt the user to answer recovery questions 22-4. At step 314, once the user answers recovery questions 22-4, the user is authenticated. The process ends at step 316 when the user can access the account.

Fraudulent Access

With the increased use of mobile devices for banking and other financial transactions also comes the possibility that a fraudster will try to take advantage of the processes used to authenticate users and fraudulently access a user account. SIM-swap fraud process 320 begins at step 322 with a fraudster using deceptive tactics to gather information about a user. For example, the fraudster may gain access to a social networking feed or may use fraudulent practices such as phishing to induce the user to reveal personal information.

At step 324, the fraudster contacts a mobile device vendor to get a mobile device and SIM card. The fraudster may claim to be the user and may use information about the user gathered through research or fraudulent tactics. Ideally, the mobile device vendor determines the fraudster is not the authorized user and does not provide the fraudster a mobile device or SIM card fraudulently associated with the authorized user. However, fraudsters have been successful in some endeavors and may be able to get a mobile device and SIM card that are fraudulently associated with the authorized user.

At step 306, the fraudster logs into a new instance of MDA 50 installed on mobile device 30. MDA 50 is configured to retrieve mobile device ID 34 for mobile device 30 and communicate with Subscriber Identity Module (SIM) card 36 to retrieve International Mobile Subscriber Identity (IMSI) information 38 for SIM card 36. The fraudster does not want mobile device or MDA 50 to capture biometric information and it is unlikely that the fraudster knows user information 52 including account ID 54, username 56 and password 58. At this point, the fraudster may indicate via MDA 50 that they have forgotten username 56 and/or password 58.

At step 308, MDA 50 communicates user information 52 including account ID 54, username 56 and password 58 (if provided), along with mobile device ID 34 and SIM card IMSI 38 to server 12.

At step 310, server 12 determines if user information 52 matches account information 18. Since the fraudster is trying to bypass normal security measures and gain access fraudulently, server 12 likely determines user information 52 does not match account information 18. At step 326, the fraudster attempts to access the account by tricking a customer service agent into thinking the fraudster is a user associated with account ID 20. If successful, the fraudster is authenticated at step 314 and the process ends when the fraudster can access the account at step 328. Once a fraudster has access to an account, they can withdraw money from a debit account or charge money to a credit account. In some situations, a fraudster may be successful in getting the customer service agent to replace mobile device ID 26 associated with account ID 20 with mobile device ID 34 associated with the fraudster's mobile device 30 and replace SIM card IMSI 28 associated with account ID 20 with the fraudster's SIM card IMSI 38. The user associated with account ID 20 is then unable to access his/her own account, giving the fraudster more time to withdraw funds or charge debts to the account before the fraud is discovered.

Intelligence-Based System for Detecting SIM-Swap Fraud

Referring back to FIG. 1, embodiments disclosed herein address these forms of fraudulent activity.

Embodiments of intelligence system 400 includes social intelligence interceptor 410 stored in mobile device memory 32. Social intelligence interceptor 110 intercepts user information from MDA 50, communicates with one or more applications 40 installed in mobile device memory 32 to gather mobile device user application information 112, and generates a mobile device user profile 114 using mobile device user application information 112. Social intelligence interceptor 110 is configured to send calls to application programming interfaces (APIs) associated with applications 40. APIs are sets of routines and protocols that allow software components to interact. One type of API is an open API, which refers to any publicly available application programming interface that allows access to a proprietary software application or web service. Open APIs provided by a social networking website allow users to create an account on an external site or application using social media website credentials. Social intelligence interceptor 110 is also configured to send service calls to in-house applications 44 installed on mobile device 30 that may require specialized routines or protocols not publicly available. In-house applications 44 may have more restrictions on what data or information is accessible.

Embodiments of intelligence system 100 includes social intelligence module 120 stored in memory 16 in server 12. In some embodiments, social intelligence module 120 communicates with social intelligence interceptor 110 to collect mobile device user application information 112. Social intelligence module 120 uses mobile device user application information 112 collected from one or more applications 40 and in-house applications 44 to generate a user profile 122 corresponding to a user associated with account ID 20. Social intelligence module 120 is further configured for authenticating users or denying access to fraudsters. In some embodiments, social intelligence module 120 is configured to compare a user profile 122 associated with account ID 20 with mobile device user profile 114 generated by social intelligence interceptor 110 to calculate a user profile match confidence. In some embodiments, social intelligence module 120 is configured to receive user application information 124 associated with account ID 20 and receive mobile device user application information from social intelligence interceptor 110 to calculate a user profile match confidence.

User Profile Generation

Figure 4:
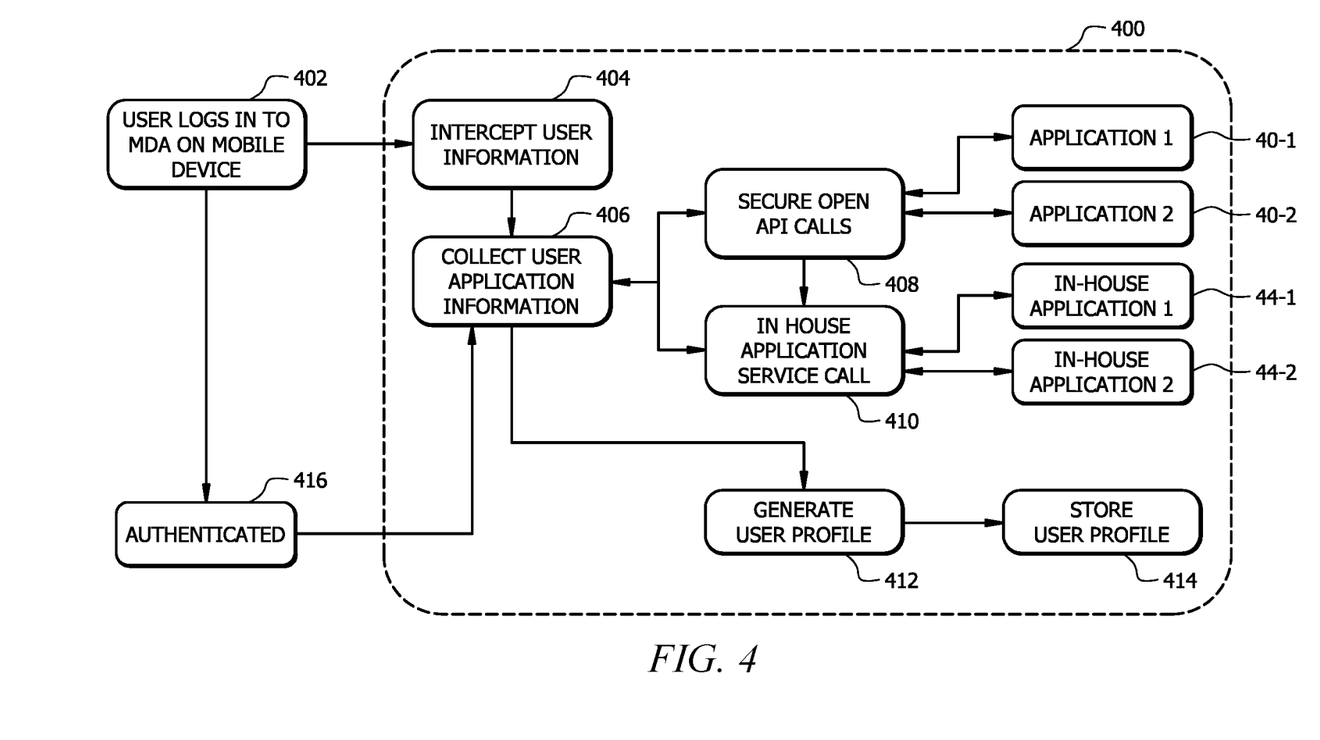
FIG. 4 is a flowchart of a process used to authenticate users and a process to generate an authenticated user profile.

An intelligent method to detect fraud involves generating a user profile based on user application profile and application usage information associated with account ID 20 and stored in authentication server 12. FIG. 4 is a flowchart of a process used to authenticate users including a process to generate a user profile for a user associated with account ID 20.

To provide additional account security, embodiments described herein include a user profile generation process 400.

At step 402, a user logs in to a mobile device application (MDA) 50 installed in mobile device memory 32 on mobile device 30 and enters user information 52. If it is the first time the user is attempting to access an account, MDA 50 may prompt the user to provide an account ID 54 and perform an initial set up which may include providing additional user information including a username 56 and password 58, and may also include providing biometric information, username/password recovery questions and user preferences. MDA 50 is configured to retrieve mobile device ID 34 and communicate with Subscriber Identity Module (SIM) card 36 to retrieve International Mobile Subscriber Identity (IMSI) information 38.

At step 404, social intelligence interceptor 110 intercepts user information 52. In some embodiments, social intelligence interceptor 110 communicates with mobile device application 50 to intercept user information 52.

At step 406, social intelligence module 120 collects user application information 124. In some embodiments, collection of user application information 124 begins once the user of mobile device 30 is authenticated at step 416.

At step 408, social intelligence interceptor 110 communicates with applications 40 installed on mobile device 30 to retrieve information related to interactions between a user associated with account ID 20 and one or more social networking sites 42. Communication between social intelligence interceptor 110 and application 40-1 may be performed by a secure open call to an application programming interface (API) associated with application 40-1 and communication between social intelligence interceptor 410 and application 40-2 may be performed by a secure open call to an application programming interface (API) associated with application 40-2. The number of API calls depends on the number of applications 40 installed on mobile device 30. User application information collected from applications 40 may include profile information or usage information. Profile information includes a total number of application profiles associated with a user. Usage information includes information such as how frequently, how many times or what time of day a user on mobile device 30 logs in to a particular application 40-1, 40-2 or 40-3, or any other information associated with usage of an application 40-1, 40-2 or 40-3 by a user on mobile device 30 associated with account ID 20.

At step 410, social intelligence interceptor 110 communicates with in-house applications 44 installed on mobile device 30 to retrieve information related to interactions with in-house applications 44 by a user associated with account ID 20. Communication between social intelligence interceptor 410 and in-house applications 44-1, 44-2 may be performed by service calls to in-house applications 44-1, 44-2. The number of service calls depends on the number of in-house applications 44 installed on mobile device 30. User application information collected from applications 44 may include profile information or usage information. Profile information may include a total number of application profiles associated with a user associated with account ID 20. Usage information includes information such as how frequently, how many times or what time of day a user associated with account ID 20 uses mobile device 30 to log in to a particular application 44-1 or 44-2, and may include any other information associated with usage of an application 44-1 or 44-2 by a user on mobile device 30.

At step 412, social intelligence module 112 uses the collected user application information to generate a user profile for a user associated with account ID 20. In some embodiments, natural language processing (NLP) is used to analyze user application information collected from applications 40 or in-house applications 44 to generate user profile 122. A user profile may be generated based on user application profile information and user application usage information. The process ends at step 414 when a user profile 122 for a user associated with account ID 20 is stored in memory 16. In some embodiments, a user profile 122 is encrypted in memory 16.

In some embodiments, steps 406-414 are completed after the user has been authenticated at step 416. In other embodiments, social intelligence module 112 may complete steps 406-410 but does not complete steps 412 and 414 unless the user is authenticated.

Fraud Detection

Figure 5:
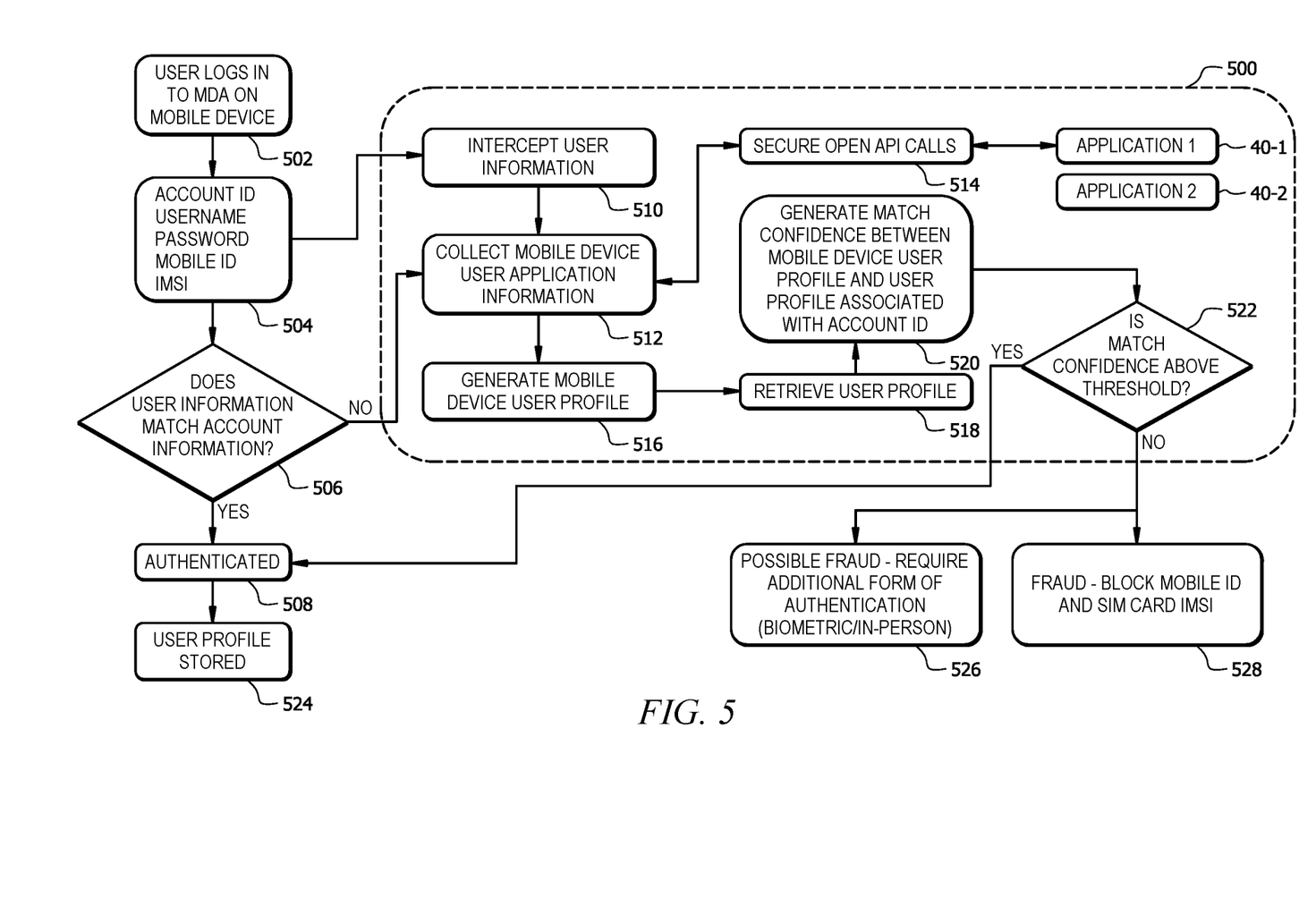
FIG. 5 is a flowchart of a process used to authenticate users and a process to generate a mobile device user profile, illustrating a method for authenticating users with new/replacement mobile devices while preventing fraudulent access to accounts.

FIG. 5 is a flowchart of a process used to authenticate users, including a process for comparing a mobile device user profile with an authenticated user profile stored in memory.

At step 502, a user logs in a mobile device application (MDA) 50 installed in mobile device memory 32 on mobile device 30 and enters user information 52. If it is the first time the user is attempting to access an account, MDA 50 may prompt the user to provide an account ID 54 and perform an initial set up which may include providing additional user information including a username 56 and password 58, and may also include providing biometric information, username/password recovery questions and user preferences. MDA 50 is configured to retrieve mobile device identification (mobile device ID) 34 and communicate with Subscriber Identity Module (SIM) card 36 to retrieve International Mobile Subscriber Identity (IMSI) information 38.

At step 504, MDA 50 communicates user information 52 including account ID 54, username 56 and password 58, along with mobile device ID 36 and IMSI 38 to authentication server 12.

At step 506, server 12 determines if user information 52 matches account information 18. In some embodiments, server 12 determines if username 56, password 58, mobile device ID 34 and IMSI 38-1, 38-2 communicated by MDA 50 match username 22-1, password 22-2, mobile device ID 26 and IMSI 28-1 or 28-2 in account information 18.

At step 510, if server 12 determines username 56, password 58, mobile device ID 34 and IMSI 38-1, 38-2 communicated by MDA 50 match username 22-1, password 22-2, mobile device ID 26 and IMSI 28-1 or 28-2 in account information, then the user of mobile device 30 is authenticated and able to access the account.

To provide additional account security, embodiments described herein include a fraud detection process 500.

In particular, after MDA 50 communicates user information 52 including account ID 54, username 56 and password 58, along with mobile device ID 36 and SIM card IMSI 38 to server 12, at step 510, social intelligence interceptor 110 intercepts user information 52. In some embodiments, social intelligence interceptor 110 communicates with mobile device application 50 to intercept user information 52.

At step 512, social intelligence interceptor 110 collects mobile device user application information 412. In some embodiments, social intelligence interceptor 110 begins collection of mobile device user application information 112 once embodiments determine mobile device ID 34 and/or IMSI 38-1 or 38-2 collected by MDA 50 installed on mobile device 30 does not match mobile device ID 26 and/or IMSI 28-1 or 28-2 stored in memory 16.

At step 514, embodiments communicate with applications 40 installed on mobile device 30 to retrieve information related to mobile device user interaction with social networking sites 42. Communication between social intelligence interceptor 410 and application 40-1 may be performed by a secure open call to an application programming interface (API) associated with application 40-1 and communication between social intelligence interceptor 110 and application 40-2 may be performed by a secure open call to an application programming interface (API) associated with application 40-2. The number of API calls depends on the number of applications 40 installed on mobile device 30. In some embodiments, social intelligence interceptor 110 is configured to communicate with a set of applications 40. In other embodiments, social intelligence interceptor 110 is configured to communicate with all applications 40 installed on mobile device 30.

At step 516, social intelligence module 120 uses mobile device user application information 112 to generate mobile device user profile 114. In some embodiments, natural language processing (NLP) is used to analyze mobile device user application information 112 collected from applications 40 to generate mobile device user profile 114.

At step 518, a user profile 122 associated with account ID 20 is retrieved from memory 16. In some embodiments, social intelligence module 120 retrieves a user profile 122.

At step 520, social intelligence module 120 generates a profile match confidence between mobile device user profile 114 and user profile 122.

At step 522, social intelligence module 120 determines if the profile match confidence is above a minimum threshold.

If the profile match confidence is above a threshold, then at step 508 the user of mobile device 30 is authenticated. In some embodiments, at step 524, mobile device ID 34 and IMSI 38-1 or 38-2 associated with SIM card 36-1 or 36-2 are stored in memory 38 as mobile device ID 26 and IMSI 28-1 or 28-2.

Alternatively, if the profile match confidence is within a range of a threshold, then at step 526 the user of mobile device 30 is prompted to provide additional information for authentication in the context of possible fraud. Additional information may include providing biometric information for comparison with biometric information 22-3 stored in memory 16, appearing in person at an authorized institution, or otherwise providing additional information necessary to confirm the user of mobile device 30 is associated with account ID 20.

Alternatively, if the profile match confidence is below a threshold, then at step 528, mobile device 30 associated with mobile device ID 34 and/or IMSI 38-1 or 38-2 is blocked from accessing an account in the context of a determination of fraud.

Embodiments disclosed herein may be performed by one or more processors 14. Processor(s) 14 comprise(s) any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). In various embodiments, processor 14 comprises a programmable logic device, a microcontroller, a microprocessor, or any combination of the preceding. For example, processor 14 is configured to execute programs and instructions to process data, may be implemented in hardware or software, and may be 8-bit, 16-bit, 32-bit, 64-bit or other architecture. One or more processors 14 may be configured to implement various instructions. For example, in some embodiments, one or more processors 14 are configured to execute instructions to implement a user authentication process, an authorized user profile generation process, a mobile device user profile generation process, or a fraud detection process. In some embodiments, processor 14 comprises a special purpose computer designed to implement one or more functions disclosed herein.

Network interface 20 is configured to enable communications between authentication server 12 and mobile devices 30 over a wired and/or wireless network. For example, network interface 20 may comprise a WIFI interface, a LAN interface, a WAN interface, a modem, a switch, or a router. Processor 14 is configured to send and receive data using network interface 20 using any communication protocol as would be appreciated by one of ordinary skill in the art. A network may be any network configured to support wireless communication between mobile devices 14 and authentication server 12 using a communication protocol for a financial transaction, including encryption. A network may be any type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network.

Memory 16 is communicatively coupled to and in signal communication with processor 14 and comprises one or more disks, tape drives, or solid-state drives, and may be used as an over-flow data storage device, to store programs when such programs are selected for execution, and to store instructions and data that are read during program execution. Memory 16 comprises volatile or non-volatile, including read-only memory (ROM), random-access memory (RAM), ternary content-addressable memory (TCAM), dynamic random-access memory (DRAM), and static random-access memory (SRAM).

In the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for intelligent authentication of a mobile device user, the system comprising:
a mobile device application (MDA) installed on a mobile device and configured to:
  receive mobile device user information from the mobile device user requesting access to an account; and
  retrieve a mobile device identification (ID) and an International Mobile Subscriber Identity (IMSI) from the mobile device;
a social intelligence interceptor configured to:
  collect mobile device user application information from one or more third-party applications associated with the mobile device; and
  generate a mobile device user profile based on the collected mobile device user application information;
a server communicatively coupled to the mobile device, the server comprising:
  a memory storing account information including an account identification (ID), user information, a mobile device ID and an IMSI associated with the account ID;
  a social intelligence module implemented by one or more hardware processors and configured to:
    collect user application information from one or more in-house applications associated with the mobile device ID associated with the account ID; and
    generate a user profile based on the user application information collected from the one or more in-house applications; and
  an authentication module implemented by the one or more hardware processors and configured to:
    receive the mobile device user information, the mobile device ID and the IMSI from the MDA;
    compare the mobile device user information, the mobile device ID and the IMSI received from the MDA with the user information, the mobile device ID, and the IMSI stored with the account ID;
    if one or more of the mobile device ID and the IMSI received from the MDA do not match the mobile device ID and the IMSI stored with the account ID:
      calculate a profile match confidence between the mobile device user profile and the user profile based on the user application information collected from the one or more in-house applications;
    if the profile match confidence is above a profile match confidence threshold, authenticate the mobile device to allow access to the account using the mobile device ID and the IMSI received from the MDA;
    if the profile match confidence is below the profile match confidence threshold, deny access to the account by the mobile device or prompt the mobile device user to provide additional verification.

2. The system for intelligent authentication of the mobile device user of claim 1, wherein:
the social intelligence interceptor is configured to send a call to one or more Application Programming Interfaces (APIs) associated with one or more third-party applications installed on the mobile device; and
the mobile device user application information comprises one or more of mobile device user application profile information and mobile device user application usage information.

3. The system for intelligent authentication of the mobile device user of claim 2, wherein:
the social intelligence module is configured to send a service call to one or more in-house applications; and
the user application information associated with the account ID comprises one or more of user application profile information and user application usage information for the one or more in-house applications and the one or more third-party applications.

4. The system for intelligent authentication of the mobile device user of claim 3, wherein the social intelligence module is further configured to store one or more of the mobile device user information, the mobile device ID and the IMSI received from the MDA as the user information associated with the account ID.

5. The system for intelligent authentication of the mobile device user of claim 3, wherein at least one third-party application comprises a social networking site.

6. The system for intelligent authentication of the mobile device user of claim 3, wherein the social intelligence module is configured to compare the mobile device user application profile information received from the one or more APIs with a total number of application profiles associated with the user associated with the account ID.

7. The system for intelligent authentication of the mobile device user of claim 3, wherein the social intelligence module is configured to compare the mobile device user application usage information with user application usage information associated with the account ID.

8. The system for intelligent authentication of the mobile device user of claim 7, wherein:
mobile device user application usage information comprises a frequency of use of one or more of the third-party applications by the mobile device user;
user application usage information comprises a frequency of use of one or more of the third-party applications by the user associated with the account ID; and
determining if the profile match confidence is above the threshold comprises determining if the frequency of use of the one or more third-party applications by the mobile device user is above the frequency of use of the one or more of the third-party applications by the user associated with the account ID.

9. A system for intelligent authentication of a mobile device user, the system comprising:
a server comprising:
   a memory storing account information including an account identification (ID), user information, a mobile device identification (ID), and an International Mobile Subscriber Identity (IMSI) associated with the account ID;
   an authentication module implemented by one or more hardware processors and configured to:
      receive mobile device user information, a mobile device identification (ID) and IMSI from a mobile device application (MDA) installed in a mobile device communicatively coupled to the server;
      compare the mobile device user information, the mobile device ID and the IMSI with the user information, the mobile device ID and the IMSI associated with the account ID;
   wherein if one or more of the mobile device ID and the IMSI received from the MDA do not match the mobile device ID and the IMSI associated with the account ID:
      collect mobile device user application information associated with the one or more third-party applications; and
      generate a mobile device user profile based on the mobile device user application information;
      calculate a profile match confidence between the mobile device user profile and the user profile for the mobile device user associated with the account ID;
         if the profile match confidence is above a profile match confidence threshold, authenticate the mobile device to allow access to the account using the mobile device ID and the IMSI received from the MDA;
         if the profile match confidence is below the profile match confidence threshold, deny access to the account or send an instruction to the MDA to prompt the mobile device user to provide additional verification.

10. The system for intelligent authentication of a user of claim 9, wherein the user application information comprises one or more of user application profile information and user application usage information.

11. The system for intelligent authentication of a user of claim 9, wherein the social intelligence module is configured to send an Application Programming Interface (API) call to one or more open APIs associated with one or more third-party applications installed on the mobile device.

12. The system for intelligent authentication of a user of claim 9, wherein the mobile device user application information comprises one or more of mobile device user application profile information and mobile device user application usage information.

13. The system for intelligent authentication of a user of claim 9, wherein at least one third-party application comprises a social networking site.

14. The system for intelligent authentication of a user of claim 9, wherein the social intelligence module is configured to determine one or more of a frequency of use of the one or more third-party applications and a number of times a third-party application is accessed by the mobile device user.

15. The system for intelligent authentication of a user of claim 9, wherein the authentication module is configured to compare the mobile device user application profile information received from the one or more APIs with a total number of application profiles associated with the user associated with the account ID.

16. The system for intelligent authentication of a user of claim 9, wherein the authentication module is configured to determine if a total number of application profiles associated with the mobile device ID received from the MDA is within a range of a total number of user application profiles for a user associated with the account ID.

\* \* \* \* \*